United States Patent [19]

Christensen et al.

[11] 4,029,557

[45] June 14, 1977

[54] TREATMENT OF WATER CONTAINING CYANIDE

[75] Inventors: Wendell N. Christensen, Brigham City; Larry W. Poulter, Ogden, both of Utah

[73] Assignee: Thiokol Corporation, Newtown, Pa.

[22] Filed: Oct. 15, 1975

[21] Appl. No.: 622,599

[52] U.S. Cl. .............................. 204/149; 204/130
[51] Int. Cl.² ...................... C02C 5/12; C02B 1/82
[58] Field of Search ........... 204/130, 131, 149, 152

[56] References Cited

UNITED STATES PATENTS

| 892,486 | 7/1908 | Woolf | 204/149 X |
|---|---|---|---|
| 2,737,298 | 3/1956 | Hendel | 204/149 X |
| 3,361,663 | 1/1968 | Murray et al. | 204/149 X |

*Primary Examiner*—Arthur C. Prescott

*Attorney, Agent, or Firm*—Stanley A. Marcus; Edward E. McCullough

[57] ABSTRACT

Sodium chloride is added to water which is then passed through at least one electrolytic cell. There, electrolysis of the sodium chloride produces chlorine molecules and sodium hydroxide. The water is then flowed into the presence of metal-cyanide contaminants. The chlorine and caustic immediately react with the metal-cyanide compounds to produce metal hydroxide precipitates, while the cyanide is decomposed and liberated from the water in carbon dioxide and gaseous nitrogen. As part of this reaction, the sodium chloride is reformed, so that the same brine can be recycled and the process repeated without further additives. The optimum pH of between 7 and 8 may be maintained as needed by addition of small amounts of hydrochloric acid to the system.

3 Claims, 2 Drawing Figures

TREATMENT OF WATER CONTAINING CYANIDE

BACKGROUND OF THE INVENTION

This invention relates to processes for treating polluted water. Specifically, it relates to apparatus and methods for destroying cyanide in water. The invention herein described was made in the course of or under a contract or subcontract thereunder, (or grant) with the U.S. Air Force.

The toxic action of cyanide on living organisms by reducing or eliminating their ability to use oxygen is well known. This action at the acute toxic level is both rapid and fatal. Not only are the cyanides hazardous to animal life, but they are also toxic to aquatic plants and can interfere with normal biological processes that tend to purify streams. Fish, for example, can be killed directly by cyanide or indirectly by destruction of the organisms on which they feed or by destruction of the microorganisms responsible for normal oxygen balance in the water. In waste treatment plants that include biological processes as part of the treatment, cyanide pollutants present a problem for the same reason.

Most cyanide pollutants are currently being produced in the discharge wastes of five industrial processes: (1) metal plating; (2) case hardening of steel; (3) neutralizing of acid "pickle scum"; (4) refining of gold and silver ores; and (5) scrubbing of stack gases from gas or producer gas furnaces. The greatest source of cyanide bearing waste is the rinse water, spillages, and drippings from electroplating solutions of cadmium, copper, silver, gold, and zinc.

The conventional integrated process for destroying cyanides in such waste waters includes adding chlorine and caustic or hypochlorite to the water, allowing insoluble solid particles to settle out, and returning the water to the rinse tank. There, the chlorine and caustic immediately react with the metal-cyanide compound on the plated part or in the water to produce harmless precipitates and the gases, carbon dioxide and nitrogen, the escape into the atmosphere.

Although this process is effective, it is somewhat hazardous and expensive. Chlorine, itself, is very toxic, corrosive, and difficult to handle, as are the caustic and hypochlorite. Special equipment and controls are required for storage and for addition of these materials to the water. Also, in a closed system wherein the rinse water is repeatedly recycled, salt buildup in the water necessitates periodic dumping and addition of fresh water.

SUMMARY OF THE INVENTION

The present invention, which overcomes these disadvantages of the prior art process, essentially comprises adding ordinary salt (NaCl) to the water, passing it through an electrolytic cell, wherein chlorine and caustic are generated from the salt, and passing the water into a wash tank where the chlorine reacts with the cyanide as described above.

This achieves the following advantages that are not available in prior-art systems for destroying cyanide in water: (1) An inexpensive, easily-available, and easy-to-handle material (NaCl) is added to the water and only once, since it is continually being decomposed, reformed, and recycled; (2) Since chlorine and caustic need not be added for each cycle, considerable expense and time are saved; and (3) Equipment and controls for handling these toxic and corrosive materials are eliminated as unnecessary.

Objects of the invention are to provide a simple, safe, efficient, and inexpensive process for destroying cyanide in water. Other objects and advantages of the invention will become apparent as the following detailed description is read with reference to the accompanying drawing. The same numbers are used to designate the same parts throughout the disclosure.

DESCRIPTION OF THE PREFERRED EMBODIMENTS

The invention includes a closed system wherein the water containing a salt solution is repeatedly recycled and a flow-through system wherein the cyanide is destroyed and the water may be passed on to further purification processes.

Figure 1:
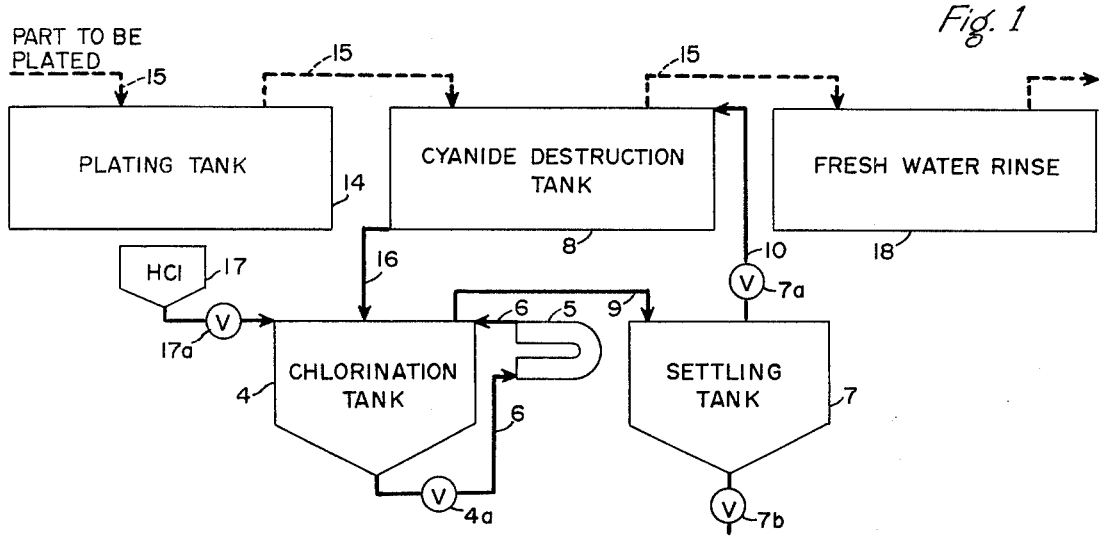
FIG. 1 is a diagram of the apparatus of the invention.

The closed system, illustrated in FIG. 1, is most useful in electroplating processes involving cadmium, copper, silver, gold, zinc, etc., wherein cyanide compounds are commonly used.

Referring to FIG. 1, common salt, or sodium chloride, is added to water in the chlorination tank 4 in small increments until it constitutes about 1 to 6% by weight of the solution. During this time, the brine is circulated through at least one electrolytic cell 5 and back into the chlorination tank in a closed loop via pipes 6 as many times as desired. This circulation may be regulated or stopped by the valve 4a. The electrolytic cell electrolyzes the sodium chloride and water to produce chlorine molecules and solium hydroxide, or caustic. When a desired concentration of chlorine has been obtained (about 50 to 100 mg/liter), the water is flowed through a settling tank 7 and into a cyanide-destruction tank 8, via pipes 9 and 10, respectively. This flow may be controlled or stopped by the valve 7a.

Figure 2:
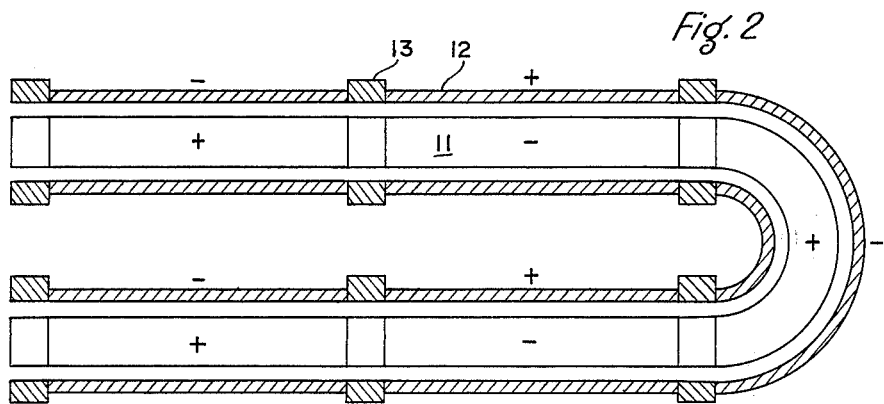
FIG. 2 is a sectional diagram of the electrolytic cell.

The typical electrolytic cell 5 is a commercially available item and is shown schematically in FIG. 2. The water containing the sodium chloride is introduced into one end of the cell 5, which is essentially a series of pairs of concentric tubes 11 and 12 separated by insulators 13. These pairs of concentric tubes 11 and 12 are connected to a direct current source of electric power (not shown) by electrical conductors (not shown), so that the members of each pair have charges of opposite polarity to form an anode and cathode that produce an electric field between them. The polarities are reversed in consecutive parts of tubes 11 and 12 in the series to promote a more thorough electrolysis of the sodium chloride and water.

A part to be plated (not shown) is placed in the plating tank 14, where it is plated with a metal and wherein a well-known plating process includes use of a cyanide compound. When the plating process is complete, the plated part is removed and rinsed in the cyanide-destruction tank 8. (Transporting of the plated part from one tank to another is represented by broken arrows 15.) The chlorine and caustic in the tank 8 immediately react with the cyanide compound to produce harmless gases and precipitates.

The electrolytic production of chlorine and caustic, and subsequent reaction with cyanide compounds typically occur as follows;

$6\text{ NaCl} + 6\text{ H}_2\text{O}$ 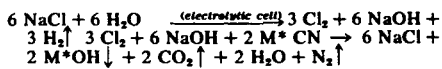 $3\text{ Cl}_2 + 6\text{ NaOH} + 3\text{ H}_2\uparrow$
$3\text{ Cl}_2 + 6\text{ NaOH} + 2\text{ M*CN} \rightarrow 6\text{ NaCl} + 2\text{ M*OH}\downarrow + 2\text{ CO}_2\uparrow + 2\text{ H}_2\text{O} + \text{N}_2\uparrow$

*M is a metal ion, such as of cadmium, nickel, calcium, copper, gold, and silver.

When the cyanide has been destroyed, the water, containing reformed sodium chloride is passed through a settling tank 7, via pipes 16 and 9, where the precipitates and other solid particles may settle out and be removed through the valve 7b. It is then returned to the cyanide-destruction tank 8 for reuse. A small tank 17 of hydrochloric acid is connected to the chlorination tank 4 for adjustment of the pH therein as needed through the valve 17a. It has been found that the optimum pH of the system is between 7 and 8, and that apparent formation of bicarbonates and carbonates tends to increase the alkalinity to undesirable levels. The hydrochloric acid also helps in contributing chloride ions to the system to replace those removed by the metal part "drag out" to the fresh water rinse.

After the cyanide has been destroyed in the cyanide-destruction tank 8, the part that has been plated is removed from this tank to the fresh water rinse tank 18, where the brine is thoroughly removed (as shown by the broken arrow 15).

An incidental and unexpected benefit of this process is that the chlorine and caustic in the cyanide-destruction tank 8 are also effective in destroying or decomposing the organic cleansing agents, such as Metex, commonly used in the plating tank 14 to promote a bright finish on the plated part.

EXAMPLE

The water in the system was gradually charged with 3% by weight of sodium chloride (NaCl) and with 0.05% of magnesium chloride ($MgCl_2$) (which is used to prevent the buildup of hard water deposits in the electrolytic cell). Cyanide from plated parts was simulated by adding concentrated cadmium cyanide plating waste (containing 62,999 mg/liter of cyanide) to the wash tank. A small amount of hydrochloric acid was also added until the pH was adjusted to 8.

This solution was then passed through an energized 50-square-inch PEPCON electrolytic cell that was operated to maintain about 50 to 100 milligrams of chlorine per liter in the system.

The concentrated plating solution was added at the rate of 1 ml/min. or 480 ml during an eight-hour day for 20 days. Samples withdrawn indicated much lower levels of cyanide when the pH of the system was maintained between 7 and 7.5. Test results indicated an average decrease of cyanide to less than 5 ppm in the resulting water.

Subsequent experiments were conducted using cyanide contaminated wastes from the plating processes of copper and nickel, with similar, satisfactory results. Twenty percent of the volume of solution added was concentrated metal-cyanide compounds.

Most of the chlorides will function in this process, especially chlorides of potassium and magnesium. However, since sodium chloride is far more readily available, inexpensive, and easy to handle, the present invention is directed especially to its use in the process of destroying cyanide in water.

An invention has been described that represents an advance in the art of waste treatment. Although the embodiments have been described specifically with regard to detail, it should be noted that many such details may be altered without departing from the scope of the invention as it is defined in the following claims. For example, the sodium chloride could be added directly to the water containing the cyanide, and then passed through the electrolytic cell.

The invention claimed is:

1. The process for destroying cyanide in water containing a metal-cyanide compound, comprising the steps of:
   adding 1 to 6% by weight of sodium chloride to water;
   passing the water through at least one energized electrolytic cell, wherein the sodium chloride and water are electrolyzed to produce chlorine and sodium hydroxide;
   mixing this water with that containing the metal-cyanide compound;
   allowing the chlorine and sodium hydroxide to react with the metalcyanide compound, wherein the cyanide is released in harmless gaseous products, the metal is precipitated, and the sodium chloride is reformed; and
   recycling the resulting water containing the sodium chloride for repetition of the process.

2. the process of claim 1 including addition of 0.05% to 1.0% of magnesium chloride (Mg $Cl_2$) to the water to prevent deposits of calcium on the electrolytic cell.

3. The process of claim 1 wherein the pH is controlled to be between 7 and 8 by addition of hydrochloric acid.

* * * * *